United States Patent
Mogul

(10) Patent No.: US 6,647,419 B1
(45) Date of Patent: Nov. 11, 2003

(54) SYSTEM AND METHOD FOR ALLOCATING SERVER OUTPUT BANDWIDTH

(75) Inventor: Jeffrey Clifford Mogul, Menlo Park, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/401,617

(22) Filed: Sep. 22, 1999

(65) Prior Publication Data (65)

(51) Int. Cl.[7] .............................................. G06F 15/173
(52) U.S. Cl. ....................... 709/226; 709/223; 709/232; 370/230; 370/232; 370/238; 370/468
(58) Field of Search ................................ 709/226, 223, 709/230, 232; 370/230, 231, 232, 233, 234, 235, 236, 237, 238, 468, 465

(56) References Cited

U.S. PATENT DOCUMENTS

| | | | | |
|---|---|---|---|---|
| 5,479,404 A | * | 12/1995 | Francois et al. ............ 370/468 |
| 5,485,460 A | * | 1/1996 | Schrier et al. .............. 709/227 |
| 5,640,389 A | * | 6/1997 | Masaki et al. .............. 370/418 |
| 5,764,645 A | * | 6/1998 | Bernet et al. .......... 370/395.52 |
| 5,805,203 A | * | 9/1998 | Horton ....................... 725/119 |
| 5,907,555 A | * | 5/1999 | Raith .......................... 370/468 |
| 5,996,013 A | * | 11/1999 | Delp et al. .................. 709/226 |
| 6,021,263 A | * | 2/2000 | Kujoory et al. ............. 709/232 |
| 6,046,980 A | * | 4/2000 | Packer ........................ 370/230 |
| 6,075,791 A | * | 6/2000 | Chiussi et al. .............. 370/412 |
| 6,122,287 A | * | 9/2000 | Ohanian et al. ............ 370/465 |
| 6,154,776 A | * | 11/2000 | Martin ........................ 709/226 |
| 6,167,445 A | * | 12/2000 | Gai et al. .................... 709/223 |
| 6,170,022 B1 | * | 1/2001 | Linville et al. ............... 710/29 |
| 6,173,325 B1 | * | 1/2001 | Kukreja ...................... 709/224 |
| 6,175,575 B1 | * | 1/2001 | Ahuja et al. ................ 370/524 |
| 6,208,640 B1 | * | 3/2001 | Spell et al. ................. 370/358 |
| 6,247,061 B1 | * | 6/2001 | Douceur et al. ............ 709/240 |
| 6,286,052 B1 | * | 9/2001 | McCloghrie et al. ....... 709/238 |
| 6,292,834 B1 | * | 9/2001 | Ravi et al. .................. 709/233 |
| 6,321,260 B1 | * | 11/2001 | Takeuchi et al. ........... 709/223 |
| 6,359,901 B1 | * | 3/2002 | Todd et al. ................. 370/465 |
| 6,381,228 B1 | * | 4/2002 | Prieto et al. ............... 370/323 |
| 6,389,010 B1 | * | 5/2002 | Kubler et al. ............... 370/353 |
| 6,404,738 B1 | * | 6/2002 | Reininger et al. .......... 370/236 |
| 6,438,141 B1 | * | 8/2002 | Hanko et al. ............... 370/477 |
| 6,477,670 B1 | * | 11/2002 | Ahmadvand ................ 714/712 |
| 6,487,170 B1 | * | 11/2002 | Chen et al. ................. 370/231 |

OTHER PUBLICATIONS

Almeida, Jussara et al. "Providing Differentiated Levels of Service in Web Content Hosting," Technical Report, Computer Sciences Department, University of Wisconsin–Madison, Mar. 1998.*

Treese., G. Winfield and Wolman, Alec. "X Through the Firewall,and Other Application Relays," Cambridge Research Lab Technical Report 93/10, Digital Equipment Corporation, May 3, 1993. Jan. 25, 1994.*

(List continued on next page.)

Primary Examiner—Robert B. Harrell
Assistant Examiner—M H P

(57) ABSTRACT

A server computer handles multiple data flows between itself and other devices. The server has one or more applications that allocate bandwidth to respective flows and a network protocol stack that implements those allocations. When bandwidth allocations are made in accordance with a bandwidth allocation policy, the protocol stack in the network server enforces the policy. The network protocol stack provides a programming interface that allows the application to specify the bandwidth allocation for a flow. The network protocol stack then enforces this allocation unless there is no shortage of available bandwidth.

27 Claims, 4 Drawing Sheets

OTHER PUBLICATIONS

Floyd, Sally and Jacobson, Van. "The Synchronization of Periodic Routing Messages," IEEE/ACM Transactions on Networking, vol. 2, No. 2, Apr. 1994, pp. 122–136.*

Skowler et al. "The PPP Multilink Protocol (MP)" Network Working Group, RFC 1990, Aug. 1996.*

C. Richards and K. Smith, "The PPP Bandwidth Allocation Protocol (BAP)" and "The PPP Bandwidth Allocation Control Protocol (BACP)", Network Working Group, RFC 2125, Mar. 1997.*

Hariri, Salim et al. "A Hierarchical Analysis Approach for High Performance Computing and Communication Applications," Proceedings of the 32nd Hawaii International Conference on System Sciences, 1999.*

Metz, Chris. "IP QoS: Traveling in First Class on the Internet," IC Online: On the Wire, 1999.*

Floyd, Sally and Jacobson, Van. "Link–Sharing and Resource Management Models for Packet Networks" IEEE/ACM Transactions on Networking, vol. 3, No. 4, Aug. 1995, pp. 365–386.*

"Controlling TCP/IP Bandwidth" TCP/IP Bandwidth Management Series, vol. 1, No. 1, The Packeteer Technical Forum.*

"Shaping Traffic Behavior" TCP/IP Bandwidth Management Series, vol. 1, No. 2, The Packeteer Technical Forum.*

"Managing UDP Traffic" TCP/IP Bandwidth Management Series, vol. 1, No. 3, The Packeteer Technical Forum.*

A Hierarchical Analysis Approach for High Performance Computing and Communication Applications:; Salim Hariri et al. Proceedings of the 32$^{nd}$ Hawaii International Conference on System Sciences; IEEE; 1999.*

Hariri, Salim et al. "A Heirarchical Analysis Approach for High Performance Computing and Communication Applications," Proceedings of the 32nd Hawaii International Conference on System Sciences, 1999.*

"End–host Architecture for QoS–Adaptive Communication"; Tarek Abdelzaher and Kang G. Shin; IEEE Real–Time Technology and Applications Symposium; Denver, CO, Jun. 1998.

Almeida et al., "Providing Differentiated Levels of Service in Web Content Hosting", Computer Sciences Department; Univ of Wisconsin Madison http://www.cs.wisc.edu/'cao/papers.html ; Last accessed on Jul. 24, 2002.

Floyd et al., "The Synchronization of Periodic Routing Messages", *IEEE./ACM Transactions On Networking*, 1994, 2:122–136.

Floyd et al., "Link–Sharing and Resource Management Models For Packet Networks", *IEEE./ACM Transactions On Networking*, 1995, 3:365–386.

Treese et al., "X Through the Firewall, and Other Application Relays", *Digital Cambridge Research Laboratory Technical Report Series*, 1993, CRL 93/10, 1–20.

Packeteer Inc., "Shaping Traffic Behavior", *TCP/IP Bandwidth Management Series*, 1997, vol. 1 No. 2, 1–16.

Packeteer Inc., "Controlling TCP/IP Bandwidth", *TCP/IP Bandwidth Management Series*, 1997, vol. 1 No. 1, 1–12.

* cited by examiner

SYSTEM AND METHOD FOR ALLOCATING SERVER OUTPUT BANDWIDTH

The present invention relates to the field of system networks, and, more particularly, to a method and apparatus for allocating bandwidth to systems transmitting data over a communication link in a network.

BACKGROUND OF THE INVENTION

In a network, such as the Internet or an Intranet, in which many systems are coupled to each other by communication links, some links may be overused, that is, the demand for bandwidth over a particular link exceeds the bandwidth that is actually available. Often, this demand results from several data flows, possibly originating from multiple sources competing for the available bandwidth. Accordingly, it is desirable to enforce a specific policy for allocating the available bandwidth among the competing sources.

Many prior art mechanisms were developed to facilitate bandwidth allocation. In one method, the routers or switches in the network are given a bandwidth reservation by data transmitting servers, and then enforce the bandwidth allocation policy. This approach requires the implementation of a reservation and/or flow-setup protocol, which may be costly. Examples of this method include "fair queuing", "weighted fair queuing", "virtual clock", etc. These mechanisms are generally aimed at simple fairness among flows and will be discussed in more detail below.

In another method, the scheduler that provides CPU time to server threads is pre-programmed to give certain threads higher priority. This approach is not practical for the short data responses typically transmitted in the Internet environment. A typical data response over the Internet is between 8 Kbytes and 16 Kbytes, whereas operating systems can generally buffer 32 Kbytes or more data waiting for transmission. When a thread gets CPU time from the scheduler, it will try to push all of its data into the operating system buffer. After the data is stored in the buffer, the priorities allocated by the scheduler have no influence on the rate at which the network protocol stack transmits data out of a buffer. This approach might have some applicability for long data responses, but is ineffective in actually allocating bandwidth according to scheduling priorities. An example of this approach is described in "Providing Differentiated Quality-of-Service in Web Hosting Services," by Jussara Almeida, Mihaela Dabu, Anand Manikutty and Pei Cao. Technical Report, Computer Sciences Dept, Univ. of Wisconsin-Madison, March 1998; and reprinted in the 1998 SIGMETRICS Workshop on Internet Server Performance.

In yet another method, the server application software uses a rate-limiting mechanism to control the amount of data it hands to the network protocol stack to be transmitted to the network. This approach was developed to prevent theft of information. This approach may be unreliable because in a large-scale system accurate control is very difficult. An example of this approach is described in "X Through the Firewall, and Other Application Relays," by G. Winfield Treese and Alec Wolman, USENIX Summer 1993 Conference Proceedings, June 1993, pages 87–99.

All of the above described approaches are inadequate when a server wants to give higher priority to specific requests. For example, a Web proxy operator may wish to give higher priority to users of the internal network, to retrievals requested by specific users, or to retrievals from specific sites.

SUMMARY OF THE INVENTION

A server computer handles multiple data flows between itself and other devices. The server has one or more applications that allocate bandwidth to respective flows and a network protocol stack that implements those allocations. When bandwidth allocations are made in accordance with a bandwidth allocation policy, the protocol stack in the server enforces the policy. The network protocol stack provides a programming interface that allows the application to specify the bandwidth allocation for a flow. The network protocol stack then enforces this allocation unless there is no shortage of available bandwidth.

The present invention provides many advantages over the prior art method of using routers or switches to implement bandwidth allocation. In the prior art method, a router must determine a flow's identity to implement appropriate bandwidth allocation. However, the current protocol, IPv4, does not include a flow label in each data packet; as a result, the router must infer flow identity from other packet header fields which can be a very complicated and time consuming process. On the other hand, the network protocol stack can simply tag internal packet buffers with the appropriate flow identities while implementing bandwidth allocations.

The present invention also dramatically reduces packet loss resulting from queue overflow. When bandwidth allocation is implemented by a router, frequently the router's queues fill up, causing packet loss. Packet loss creates severe inefficiencies and delays. Using the network protocol stack to implement bandwidth allocation allows the data packets to be deferred internally (for example, by blocking an application thread) without any packet loss.

Implementing the present invention involves minimal change to existing systems, in part because it does not involve any change to network routers between sending and receiving systems, and in part because packet-scheduling decisions are made in the network protocol stack. The sending application needs little or no modification. If the sending application is modified, it simply needs to specify the target bandwidth (or a corresponding data transmission priority level) to the network protocol stack. The sending application does not need complex mechanisms to schedule data transmissions. The present invention is also "work-conserving"; namely, when the link is idle, data is sent regardless of its priority.

Other objects, features, and advantages of the present invention will become apparent in the course of the following description and by reference to the accompanying drawings.

DETAILED DESCRIPTION OF PREFERRED EMBODIMENTS

Figure 1:
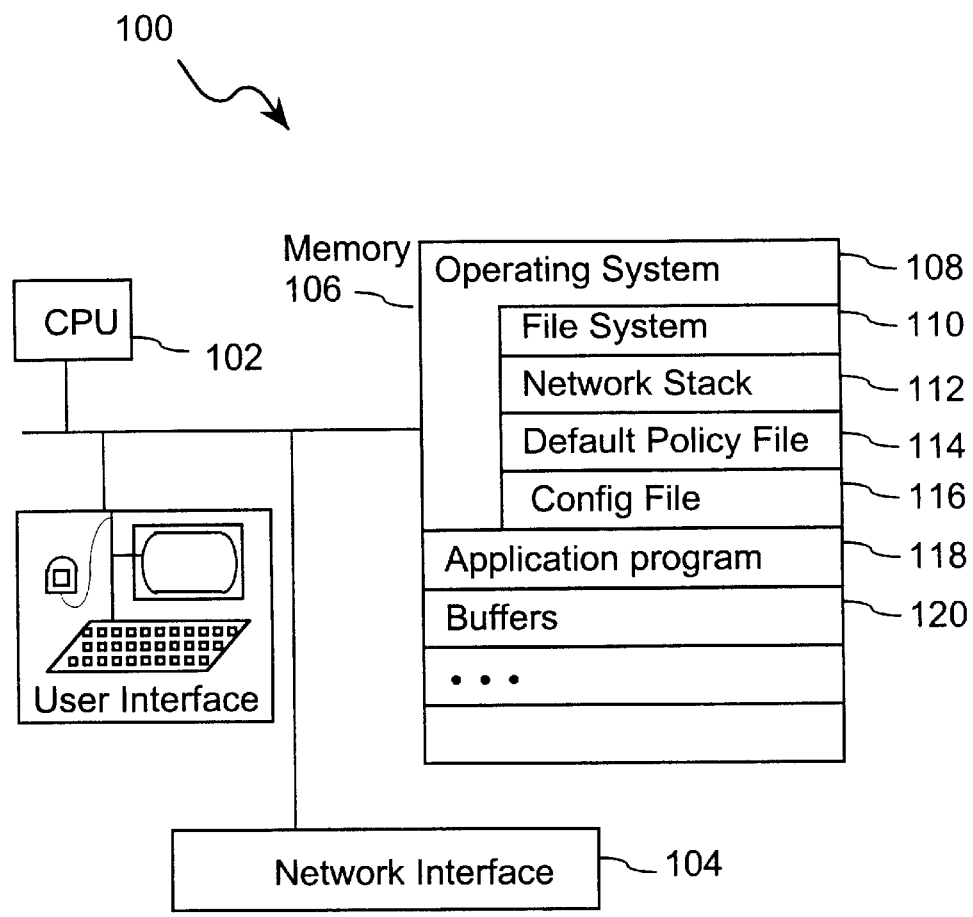
FIG. 1 is a block diagram illustrating an exemplary embodiment of a server computer.
Figure 2:
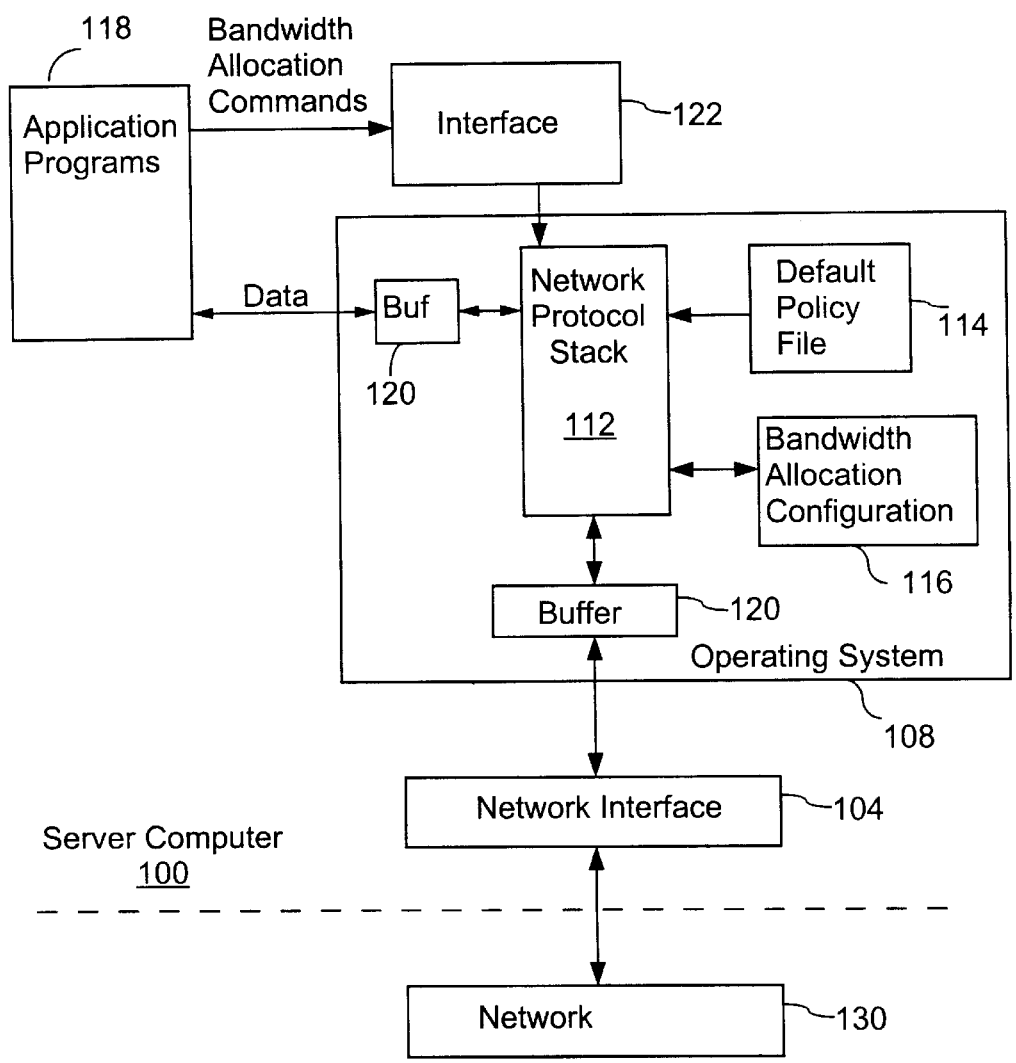
FIG. 2 depicts data flows in the server computer of FIG. 1.

Referring to FIGS. 1 and 2, a server computer 100 includes one or more central processing units (CPUs) 102, a network interface 104 and memory 106. The memory 106 typically includes both random access memory and slower non-volatile memory, such as magnetic disk storage. The memory 106 typically stores an operating system 108, one or more application programs 118 and message buffers 120. The operating system 108 preferably includes a file system 110, a network protocol stack 112, default policy file 114 and bandwidth allocation configuration file 116.

Examples of application programs 118 are Web browsers that implement rules for data transfer between computers, such as the Hypertext Transfer Protocol (HTTP) or the File Transfer Protocol (FTP). The default policy file 114 provides default bandwidth allocation policies for use by the operating system 108 or network protocol stack 112 when determining and allocating the target bandwidth of data flows. For instance, the default bandwidth allocation policy may automatically classify data flows into various classes based on their duration and actual (monitored) bandwidth usage, and then assign a target bandwidth to each data flow based on its assigned class. The configuration file 116 is used to record specific data flow bandwidth allocations and/or bandwidth allocation policies to be used with specified application programs, and thus to override the default bandwidth allocation policies.

Application programs send bandwidth allocation commands to the network protocol stack via an interface 122. To transmit data over the network 130 to a specified destination (not shown), the server 100 (under the control of an application program 118) stores the data to be transmitted in an outgoing buffer 120 and executes a network protocol stack 112, which includes procedures at a number of protocol layers for formatting data packets and controlling the flow of data packets from the server to the network.

Figure 3:
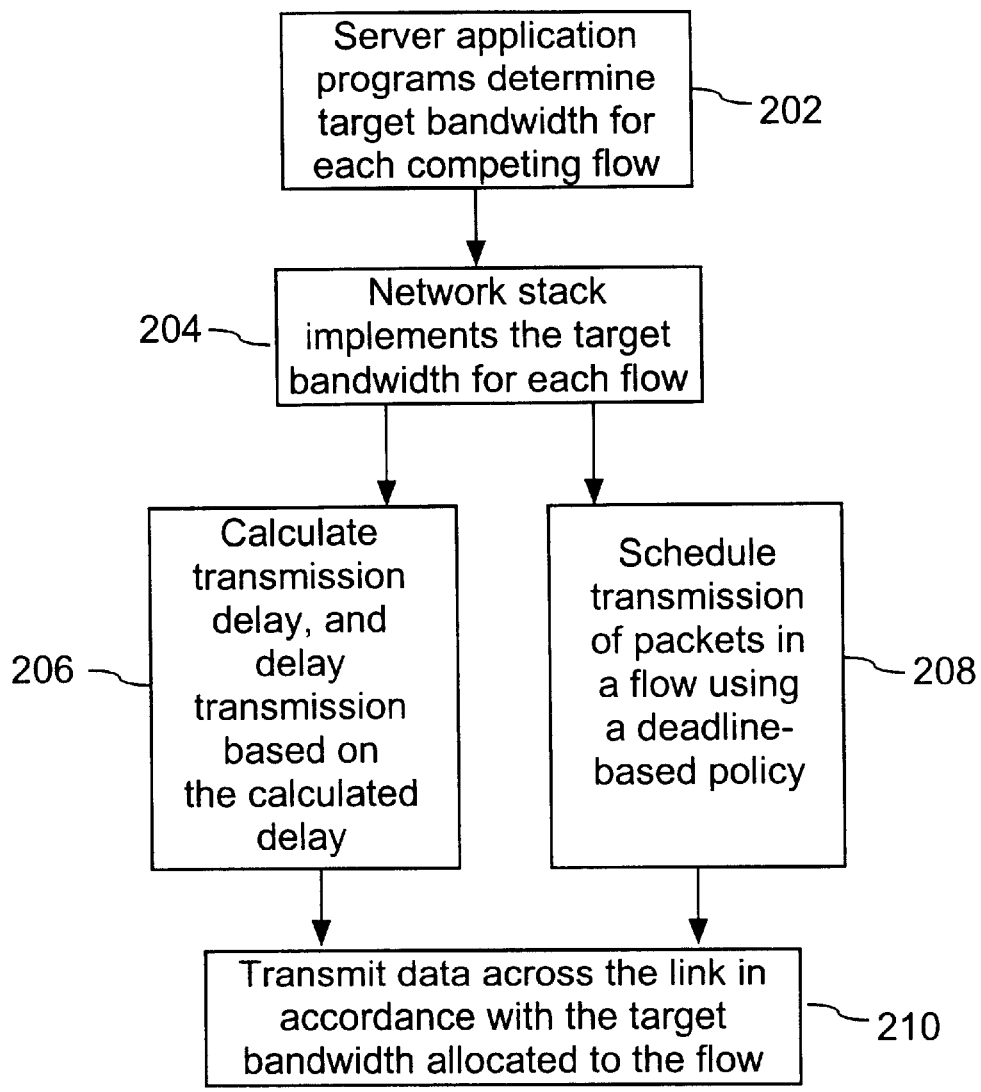
FIG. 3 is a flow chart of a bandwidth allocation and data transmission method in accordance with one embodiment of the present invention.

Referring to FIG. 3, the server application programs 118 determine a target bandwidth for each competing flow of data to be transmitted over the network (202). The target bandwidth is determined based on bandwidth allocation policies associated with specified application programs or supplied by the default policy file 114. The determined target bandwidth is then implemented by the network protocol stack for each competing flow at step (204). However, before the Data is transmitted across the link, the network protocol stack calculates any transmission delay and transmits data based on the calculated delay (206). Alternately, the network protocol stack schedules transmission of packets in a flow using a deadline based policy (208). Data is transmitted across the link in accordance with the target bandwidth allocation to the flow (210).

Figure 4:
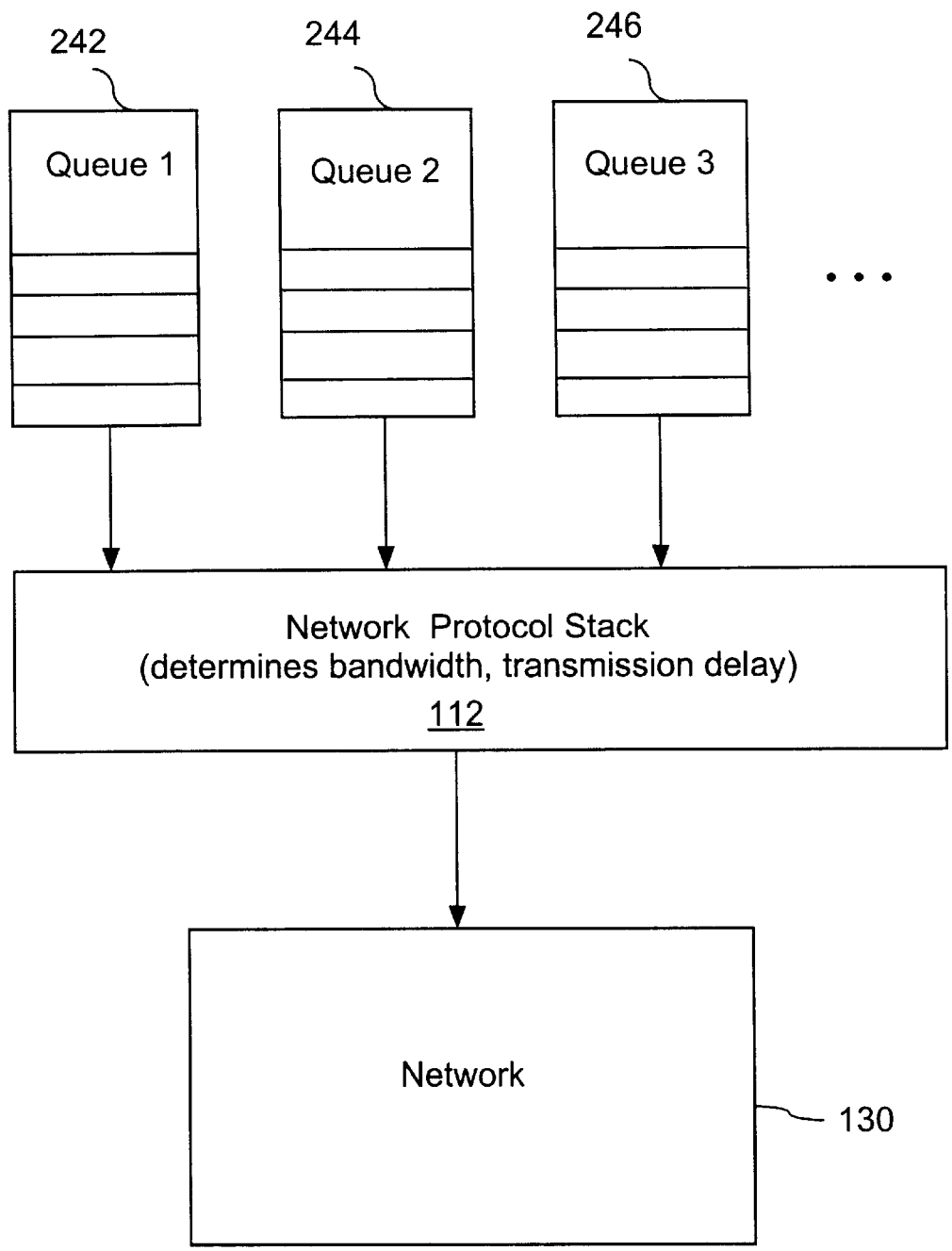
FIG. 4 is a block diagram illustrating an exemplary embodiment of the system.

FIG. 4 illustrates an embodiment of the invention in which separate queues 242, 244, 246, etc. are used to buffer respective flows of data that are to be transmitted across the network 130. Transmission of the data stored in each queue 242, 244, 246, etc. is controlled by the network protocol stack 112, in accordance with the target bandwidths for the data flows allocated to those queues. The protocol stack 112 determines the transmission delay, if any, for each queue and transmits the queued data into the network 130 accordingly.

General Operation

This invention is implemented locally to the application's host computer. It does not require any explicit reservation protocol or flow-setup protocol over the network or changes to the network infrastructure; it does not depend on any special features of network switches, routers, or receiving hosts.

In one embodiment, the application software does not participate in the bandwidth allocation process. Instead, a separate policy-setting application, such as default policy 114, provides the network protocol stack of the application host with a set of rules for assigning a target bandwidth to each flow. Examples of target bandwidth setting rules that may be included in the default policy 114 are: a rule that all flows being sent to a particular destination host H1 are to be limited to a bandwidth of 10 Kbit/sec.; a rule that all flows sent to a particular destination subnet SN1 (i.e., a pattern of host addresses) should be assigned equal bandwidth; a rule that all flows sent to another particular destination subnet SN2 should be assigned unlimited bandwidth; and a rule that all flows from a given port number (i.e., a specific service) are to be assigned a particular priority level (where the various data flow bandwidth are determine by their respective priority levels).

In another embodiment, the server uses configuration information about the available bandwidth of a downstream link to allocate bandwidth to outgoing flows. For example, suppose that the server S is connected via a 100 Mbit/sec. FDDI link F, via a router R, to a 1.5 Mbit/sec. "T1" line T. Further, the server S knows that it is the only (or primary) user of the outgoing bandwidth on line T. In this case, the host S allocates bandwidth to outgoing flows so that the total allocated bandwidth is 1.5 Mbit/sec. (the capacity of line T), rather than 100 Mbit/sec. (the capacity of link F).

In another example, suppose that router R is connected to two different external links: T and W (a 45 Mbit/sec. "T3" link). By using routing-protocol information, the host S knows for each flow whether its data packets will traverse link T or link W. The host S then allocates a total of 1.5 Mbit/sec. of bandwidth to flows using link T, and a total of 45 Mbit/sec. of bandwidth to flows using link W. In yet another example, two servers, S1 and S2, share a bottleneck link L with a bandwidth B. Each server is configured, using mechanisms that are not the subject of this document, to use a particular share of this link's bandwidth. For example, S1 is given 35% of B, and S2 is given 65% of B. In this case, the network protocol stack on host S1 allocates a total of 35% of B to its flows, and the network protocol stack on host S2 allocates a total of 65% of B to its flows. This approach can be generalized to a large number of application hosts and/or a large number of bottleneck links.

Two well known ways to allocate bandwidth among competing flows sharing the same link are flow admission control and packet-by-packet queue management. In the past, the allocated bandwidth has been typically enforced by routers and switches. In this invention, the allocated bandwidth is enforced by the network protocol stack typically located within the server that is sending the data.

Using flow admission control, when the flows are relatively short, as is the case for most Internet responses, bandwidth is allocated by controlling when each flow is admitted to the network. The network protocol stack delays the start of a flow until a set time determined by a bandwidth allocation policy. In an embodiment of this approach, once a flow is admitted, it is allowed to proceed at its full desired speed. For example, if a flow is expected to send 8 Kbytes of data with a mean bandwidth of 20% of a 1.5 Mbit/sec. link, then it should not complete before 218 msec. have passed. [8 Kbytes=65536 bits; 65536 bits/(1.5 Mbit/sec.× 0.2)=218 msec.] However, once the flow is allowed to start, it could complete in as little as 44 msec. [65536 bits/1.5 Mbit/sec.=44 msec.] Therefore, if the start of the flow is delayed (admission) by (218−44)=174 msec., the flow cannot exceed a mean bandwidth, over the 218 msec. period, of 20% of the total link speed.

Problems arise if a large number of short competing flows of equal length are presented for admission at once. For example, the link bandwidth could be wasted during the initial dead time if each flow is delayed by 174 msec. Moreover, the link may become congested when all the flows then start at the same time. This phenomenon, commonly referred to as "accidental synchronization," is described in more detail in S. Floyd and V. Jacobson "Synchronization of Periodic Routing Messages", IEEE/ACM Transactions on Networking, Vol. 2, No. 2, April, 1994.

In one embodiment of the present invention not known in the prior art, one can extend the flow-admission control approach by randomizing th e admission delay. The random delay value is chosen from a distribution, such as a uniform distribution, whose mean value is equal to the delay calculated by the above described method.

When network flows are long or flow duration is unknown, the flow-admission control approach may become inefficient or inapplicable. For these flows, bandwidth allocation is typically performed using packet-by-packet queue management. A simple first-in, first-out (FIFO) queuing is generally inadequate because it does not provide any per-flow bandwidth control. Instead, queue management methods that provide per-flow bandwidth control, such as "Fair Queuing" (FQ), "Weighted Fair Queuing" (WFQ), or "Virtual Clock" (VC), are typically implemented. FQ uses a deadline-based method for computing when to send each packet, maintains a separate queue per flow and schedules the transmission of packets to ensure that each flow gets no more than its fair share of bandwidth. The deadline-based method is analogous to the method described above for "flow admission control," but applied at the per-packet level. A version of FQ known as "Weighted Fair Queuing" provides unequal bandwidth allocations by assigning weight values to each flow.

Another well-known algorithm, "Virtual Clock", can also be employed to support bandwidth allocation. VC includes an explicit flow setup phase during which the source may indicate its needs to the network. In the prior art, after the request is received by the routers, each router inspects the flow parameters and grants or denies the request based on its current load. In an embodiment of the present invention, the network protocol stack determines whether the request should be granted based on the bandwidth allocation policy. Virtual Clock is most suitable for flows with requirements for constant data rates (such as voice or video), whereas WFQ is usually applied on burstier flows (such as Web responses).

In order to employ any of the above described bandwidth allocation mechanisms, the network protocol stack should be given a target bandwidth for each flow. If the network protocol stack uses the flow-admission control approach, it also needs an estimate of the flow length to compute a deadline for the flow. If the network protocol stack uses a packet-by-packet queue management mechanism, such as WFQ, it can use the target bandwidth to compute an appropriate weight for a flow. Using the weight information for a flow, the network protocol stack can also correct the weight assignments for other active flows. In any case, because the bandwidth-allocation mechanism is local to the sending host, bandwidth allocation is greatly simplified.

It is possible to implement a hybrid approach between flow-admission control bandwidth allocation and packet-by-packet queue management. For example, one might use the flow-admission control method for short flows of known lengths, and the packet-by-packet method for other flows. For example, each method could be given a fixed share of the available bandwidth by a supervisory program which dynamically determines what share should be given to each method.

It's also possible to implement a hybrid between traditional router-based bandwidth allocation and the present invention. For example, if a flow whose lifetime is hard to predict lasts for a long time, and if the routers support a reservation protocol (such as the RSVP protocol defined by the IETF), the sending host could perform the reservation protocol while the flow is in progress, and then transition to the router-based reservation. This hybrid method minimizes reservation protocol delays and only commits to the overhead of the reservation protocol for flows that live long enough to justify the cost. Restricting the router-based bandwidth management to a small subset of the flows improves the likelihood that the routers will have sufficient computational resources to implement the protocol and the queue-management algorithm.

Although the above embodiments are described assuming that a server computer is a single processor with its application and network protocol stack located in one machine, it should be apparent to one skilled in the art that a server computer can also be: a coupled cluster of several self-contained computers (i.e., communicating among themselves via a network) where the application runs on computer X and the network protocol stack in question runs on computer Y; a search engine built using a number of "back-end" server computers to perform database searches, and "front-end" computers that implement the Web protocols and select the proper back-end server; or other systems comprising several processors connected by a bus, switch, network, or other communication link, with the software distributed among one or more of these processors.

What is claimed is:

1. A method for transmitting a plurality of competing data flows, across a communication link in a network, comprising:

in a server computer, under the control of a plurality of application programs, generating transmission requests and data to be transmitted in a plurality of data flows;

under the control of at least one of the application programs, determining a target bandwidth of at least one of the data flows;

in the server computer executing a set of procedures in a network protocol stack of a server computer, including:

controlling transmission of each of the data flows, including controlling transmission bandwidth of each of the data flows; and executing a flow admission control protocol to control transmission of the one data flow, including calculating a flow admission delay for the one data flow based on the target bandwidth determined for the one data flow, delaying transmission of a first packet in the one data flow for a delay corresponding to the calculated flow admission delay, and then transmitting a remaining portion of the one data flow without additional delay.

2. The method of claim 1, wherein the flow admission delay for the one data flow is calculated based on the target bandwidth and at least one of a total bandwidth of the communication link and information regarding available downstream bandwidth.

3. The method of claim 1, wherein said flow admission delay is equal to a determined packet transmission period multiplied by a factor equal to one minus an allocated percentage of the target bandwidth for the data flow.

4. A method for transmitting a plurality of competing data flows, across a communication link in a network, comprising:

in a server computer, under the control of a plurality of application programs, generating transmission requests and data to be transmitted in a plurality of data flows;

under the control of at least one of the application programs, determining a target bandwidth of at least one of the data flows;

in the server computer executing a set of procedures in a network protocol stack of a server computer, including:
controlling transmission of each of the data flows, including controlling transmission bandwidth of each of the data flows; and executing a flow admission control protocol to control transmission of the one data flow, including calculating a flow admission delay for the one data flow based on the target bandwidth determined for the one data flow, and delaying transmission of a first packet in the one data flow for a delay corresponding to the calculated flow admission delay;

wherein controlling transmission includes:
dynamically determining a respective bandwidth allocation mechanism, from among a plurality of predefined bandwidth allocation mechanisms, for each of a plurality of competing data flow requests received at the network protocol stack of the server computer;

allocating a target bandwidth for each said competing data flow at the network protocol stack; and transmitting each said competing data flow from said server computer onto the communication link in accordance with the target bandwidth and the bandwidth allocation mechanism assigned to the perspective competing data flow;

wherein the plurality of predefined bandwidth allocation mechanisms includes the flow admission control protocol.

5. The method of claim 4, wherein the plurality of predefined bandwidth allocation mechanisms comprises:
a flow admission control protocol for short data flows of known length; and
at least one additional protocol selected from the group consisting of: a packet-by-packet queue management protocol,
a virtual clock protocol, and a reservation protocol.

6. The method of claim 4, wherein dynamically determining a bandwidth mechanism comprises:
establishing availability of the plurality of predefined bandwidth allocation mechanisms;
determining a set of parameters associated with each said competing data flow; and
assigning the respective bandwidth allocation mechanism for transmitting each said competing data flow in accordance with said set of parameters.

7. The method of claim 6, wherein the set of parameters of a competing data flow includes a plurality of parameters selected from the group consisting of: a data flow rate, a data flow length, a transmit duration, and a transmit deadline.

8. The method of claim 4, wherein allocating a target bandwidth for each said competing data flow comprises:
receiving a plurality of allocation rules at said network protocol stack; and
allocating a target bandwidth for each said competing data flow in accordance with said plurality of allocation rules.

9. The method of claim 8, wherein allocating a target bandwidth for each said competing data flow is performed by a server application program.

10. A computer system for transmitting a plurality of competing data flows, across a communication link in a network, comprising:

a server computer, having a plurality of application programs for generating transmission requests and data to be transmitted in a plurality of data flows;

at least one of the application programs for determining a target bandwidth of at least one of the data flows;

a network protocol stack having a set of procedures, executed by the server computer, for transmitting a plurality of data flows by:
controlling transmission of each of the data flows, including controlling transmission bandwidth of each of the data flows; and executing a flow admission control protocol to control transmission of the one data flow, including calculating a flow admission delay for the one data flow based on the target bandwidth determined for the one data flow, delaying transmission of a first packet in the one data flow for a delay corresponding to the calculated flow admission delay, and then transmitting a remaining portion of the one data flow without additional delay.

11. The computer system of claim 10, wherein the flow admission delay for the one data flow is calculated based on the target bandwidth and at least one of a total bandwidth of the communication link and information regarding available downstream bandwidth.

12. The computer system of claim 10, wherein said flow admission delay is equal to a determined packet transmission period multiplied by a factor equal to one minus an allocated percentage of the target bandwidth for the data flow.

13. A computer system for transmitting a plurality of competing data flows, across a communication link in a network, comprising:

a server computer, having a plurality of application programs for generating transmission requests and data to be transmitted in a plurality of data flows;

at least one of the application programs for determining a target bandwidth of at least one of the data flows;

a network protocol stack having a set of procedures, executed by the server computer, for transmitting a plurality of data flows by:
controlling transmission of each of the data flows, including controlling transmission bandwidth of each of the data flows; and executing a flow admission control protocol to control transmission of the one data flow, including calculating a flow admission delay for the one data flow based on the target bandwidth determined for the one data flow, and delaying transmission of a first packet in the one data flow for a delay corresponding to the calculated flow admission delay;

wherein controlling transmission includes:
dynamically determining a respective bandwidth allocation mechanism, from among a plurality of predefined bandwidth allocation mechanisms, for each of a plurality of competing data flow requests received at the network protocol stack of the server computer;

allocating a target bandwidth for each said competing data flow at the network protocol stack; and transmitting each said competing data flow from said server computer onto the communication link in accordance with the target bandwidth and the bandwidth allocation mechanism assigned to the perspective competing data flow;

wherein the plurality of predefined bandwidth allocation mechanisms includes the flow admission control protocol.

14. The computer system of claim 13, wherein the plurality of predefined bandwidth allocation mechanisms comprises:
   a flow admission control protocol for short data flows of known length; and
   at least one additional protocol selected from the group consisting of: a packet-by-packet queue management protocol,
   a virtual clock protocol, and a reservation protocol.

15. The computer system of claim 13, wherein dynamically determining a bandwidth mechanism comprises:
   establishing availability of the plurality of predefined bandwidth allocation mechanisms;
   determining a set of parameters associated with each said competing data flow; and
   assigning the respective bandwidth allocation mechanism for transmitting each said competing data flow in accordance with said set of parameters.

16. The computer system of claim 15, wherein the set of parameters of a competing data flow includes a plurality of parameters selected from the group consisting of: a data flow rate, a data flow length, a transmit duration, and a transmit deadline.

17. The computer system of claim 13, wherein allocating a target bandwidth for each said competing data flow comprises:
   receiving a plurality of allocation rules at said network protocol stack; and
   allocating a target bandwidth for each said competing data flow in accordance with said plurality of allocation rules.

18. The computer system of claim 17, wherein allocating a target bandwidth for each said competing data flow is performed by a server application program.

19. A computer readable medium carrying one or more sequences of one or more instructions for transmitting a plurality of competing data flows, across a communication link in a network, wherein the execution of the one or more sequences of the one or more instructions by one or more processors in a server computer causes the one or more processors to:
   in the server computer, under the control of a plurality of application programs, generating transmission requests and data to be transmitted in a plurality of data flows;
   under the control of at least one of the application programs, determining a target bandwidth of at least one of the data flows;
   in the server computer executing a set of procedures in a network protocol stack of a server computer, including:
      controlling transmission of each of the data flows, including controlling transmission bandwidth of each of the data flows; and
      executing a flow admission control protocol to control transmission of the one data flow, including calculating a flow admission delay for the one data flow based on the target bandwidth determined for the one data flow, delaying transmission of a first packet in the one data flow for a delay corresponding to the calculated flow admission delay, and then transmitting a remaining portion of the one data flow without additional delay.

20. The computer readable medium of claim 19, wherein the flow admission delay for the one data flow is calculated based on the target bandwidth and at least one of a total bandwidth of the communication link and information regarding available downstream bandwidth.

21. The computer readable medium of claim 19, wherein said flow admission delay is equal to a determined packet transmission period multiplied by a factor equal to one minus an allocated percentage of the target bandwidth for the data flow.

22. A computer readable medium carrying one or more sequences of one or more instructions for transmitting a plurality of competing data flows, across a communication link in a network, wherein the execution of the one or more sequences of the one or more instructions by one or more processors in a server computer causes the one or more processors to:
   in the server computer, under the control of a plurality of application programs, generating transmission requests and data to be transmitted in a plurality of data flows;
   under the control of at least one of the application programs, determining a target bandwidth of at least one of the data flows;
   in the server computer executing a set of procedures in a network protocol stack of a server computer, including:
      controlling transmission of each of the data flows, including controlling transmission bandwidth of each of the data flows; and
      executing a flow admission control protocol to control transmission of the one data flow, including calculating a flow admission delay for the one data flow based on the target bandwidth determined for the one data flow, and delaying transmission of a first packet in the one data flow for a delay corresponding to the calculated flow admission delay;
   wherein controlling transmission comprises:
      dynamically determining a respective bandwidth allocation mechanism, from among a plurality of predefined bandwidth allocation mechanisms, for each of a plurality of competing data flow requests received at the network protocol stack of the server computer;
      allocating a target bandwidth for each said competing data flow at the network protocol stack; and
      transmitting each said competing data flow from said server computer onto the communication link in accordance with the target bandwidth and the bandwidth allocation mechanism assigned to the perspective competing data flow;
   wherein the plurality of predefined bandwidth allocation mechanisms includes the flow admission control protocol.

23. The computer readable medium of claim 22, wherein the plurality of predefined bandwidth allocation mechanisms comprises:
   a flow admission control protocol for short data flows of known length;
   at least one additional protocol selected from the group consisting of: a packet-by-packet queue management protocol,
   a virtual clock protocol, and a reservation protocol.

24. The computer readable medium of claim 22, wherein dynamically determining a bandwidth mechanism comprises:
   establishing availability of the plurality of predefined bandwidth allocation mechanisms;
   determining a set of parameters associated with each said competing data flow; and assigning the respective bandwidth allocation mechanism for transmitting each said competing data flow in accordance with said set of parameters.

25. The computer readable medium of claim 24, wherein the set of parameters of a competing data flow includes a plurality of parameters selected from the group consisting of: a data flow rate, a data flow length, a transmit duration, and a transmit deadline.

26. The computer readable medium of claim 22, wherein allocating a target bandwidth for each said competing data flow comprises:

receiving a plurality of allocation rules at said network protocol stack; and allocating a target bandwidth for each said competing data flow in accordance with said plurality of allocation rules.

27. The computer readable medium of claim 26, wherein allocating a target bandwidth for each said competing data flow is performed by a server application program.

\* \* \* \* \*